United States Patent [19]

Higashi et al.

[11] Patent Number: 4,876,330

[45] Date of Patent: Oct. 24, 1989

[54] COLORLESS TRANSPARENT POLYIMIDE SHAPED ARTICLE AND PROCESS FOR PRODUCING THE SAME

[75] Inventors: Kazumi Higashi; Yuzuru Noda, both of Osaka, Japan

[73] Assignee: Nitto Electric Industrial Co., Ltd., Osaka, Japan

[21] Appl. No.: 837,987

[22] Filed: Mar. 10, 1986

[30] Foreign Application Priority Data

Mar. 10, 1985 [JP] Japan .................................. 60-46943
Jul. 11, 1985 [JP] Japan ................................ 60-152990
Jan. 18, 1986 [JP] Japan .................................... 61-8386

[51] Int. Cl.$^4$ .......................................... C08G 69/26
[52] U.S. Cl. .................... 528/353; 528/125; 528/126; 528/128; 528/172; 528/187; 528/188; 528/229
[58] Field of Search ............... 528/187, 353, 188, 125, 528/128, 126, 172, 229

[56] References Cited

U.S. PATENT DOCUMENTS

| | | | |
|---|---|---|---|
| 4,239,880 | 12/1980 | Darms .................................. | 528/125 |
| 4,378,400 | 3/1983 | Makino et al. ....................... | 528/188 |
| 4,438,256 | 3/1984 | Ohta et al. ........................... | 528/353 |
| 4,499,042 | 2/1985 | Ishizuka et al. ..................... | 528/353 |

FOREIGN PATENT DOCUMENTS 0071749 2/1983 European Pat. Off. .
0122060 10/1984 European Pat. Off. .
WO79/01029 11/1979 PCT Int'l Appl. .

OTHER PUBLICATIONS

Chemical Abstract, vol. 80, No. 24, Item 134191y, referring to Japanese Document 73 18,960 (Miyadera) published Jun. 9, 1973.

Primary Examiner—John Kight
Assistant Examiner—M. L. Moore
Attorney, Agent, or Firm—Sughrue, Mion, Zinn, Macpeak & Seas

[57] ABSTRACT

A colorless transparent polyimide shaped article having as a main component at least one recurring unit selected from the recurring units of the formulae (I) to (IX). It is useful, for example, as an oriented film in liquid crystal display devices. The polyimide shaped article is produced by a process which comprises preparing a solution of a polyamide acid having as a main component at least one recurring unit selected from the recurring units of the formulae (V) to (VIII) in an amide-type organic polar solvent, forming a shaped article of the polyamide acid from the solution, and imidizing the resulting shaped article of the polyamide acid.

17 Claims, No Drawings

COLORLESS TRANSPARENT POLYIMIDE SHAPED ARTICLE AND PROCESS FOR PRODUCING THE SAME

FIELD OF THE INVENTION

This invention relates to a colorless transparent polyimide shaped article used, for example, as a liquid crystalline oriented film, and to a process for producing the same.

BACKGROUND OF THE INVENTION

Liquid crystalline oriented films are required to have good transparency and superior electrical and mechanical properties, and polyimide films having such properties find extensive use as the liquid crystalline oriented films.

Since an aromatic polyimide is usually insoluble and infusible, a polyimide film is produced by coating a solution of polyamide acid, its precursor, in an organic polar solvent (N-methyl-2-pyrrolidone) on a substrate, and heating the coating at a high temperature to dehydrocyclize it to a polyimide and cure it. Although the polyimide film so formed has transparency, it is colored brown because of its severe heat history up to its formation. This coloration darkens the visual field to give a poor contrast and impair the function of a display element in which the polyimide film is used. Hence, such polyimide films do not meet the requirements of liquid crystalline display elements of high quality. Various polyimides have therefore been suggested in an attempt to remove the defect of coloration. Of such polyimides, a particularly good aromatic polyimide capable of forming a polyimide oriented film having a small degree of coloration and high transparency is disclosed, for example, in Japanese Patent Application (OPI) No. 91430/83 (the term "OPI" as used herein refers to a "published unexamined Japanese patent application"). This polymer has a recurring unit represented by the following formula (IX)

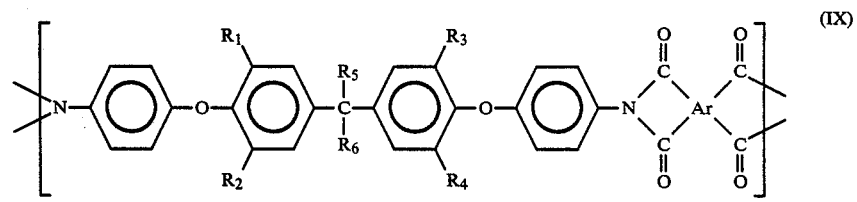

wherein $R_1$, $R_2$, $R_3$ and $R_4$ which may be the same or different each represents hydrogen, a lower alkyl group, a lower alkoxy group, chlorine or bromine, $R_5$ and $R_6$ which may be the same or different each represents hydrogen, a methyl group, an ethyl group, a trifluoromethyl group or a trichloromethyl group, and Ar represents a residue of an aromatic tetracarboxylic acid.

Although this polyimide oriented film has excellent transparency, it is colored yellow and has not proved to be entirely satisfactory for use as a liquid crystalline oriented film.

SUMMARY OF THE INVENTION

As a result of a series of studies on the cause of coloration of polyimide films, it has been found that the coloration of a polyimide depends greatly upon the combination of a aromatic tetracarboxylic acid dianhydride and a diamino compound used as starting materials for the polyimide. It has been also found that an aromatic diamine having the amino groups at the m-position is especially effective as the diamino compound, and the combination of it with a biphenyltetracarboxylic acid dianhydride can lead to the formation of a colorless transparent polyimide shaped article, and that the use of an amide-type organic polar solvent such as dimethylacetamide instead of N-methyl-2-pyrrolidone gives good results.

Accordingly, an object of this invention is to provide a colorless transparent polyimide shaped article free from such coloration, and a process for producing the same.

The colorless transparent polyimide shaped article according to this invention comprises as a main component at least one recurring unit selected from the group consisting of a recurring unit of the formula (I)

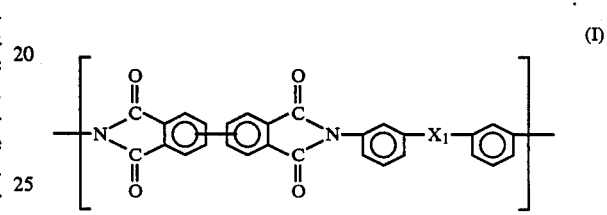

wherein $X_1$ represents O, S, $SO_2$, $CH_2$, $CF_2$, $C(CH_3)_2$, $C(CF_3)_2$ or CO; a recurring unit of the formula (II)

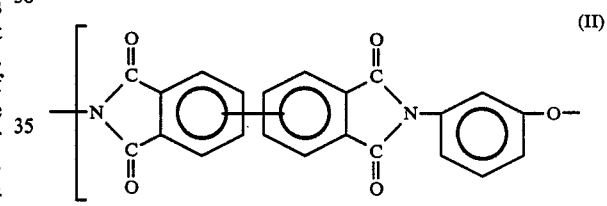

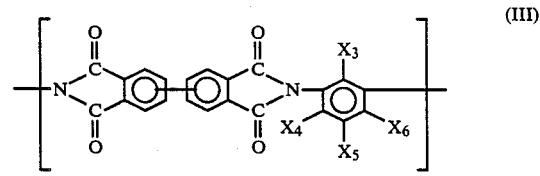

wherein $X_2$ represents $SO_2$, $C(CH_3)_2$ or $C(CF_3)_2$; a recurring unit of the formula (III)

wherein $X_3$, $X_4$, $X_5$ and $X_6$ which may be the same or different each represents H, F, Cl, $CH_3$, $C_2H_5$, $NO_2$ or $CF_3$; and a recurring unit of the formula (IV)

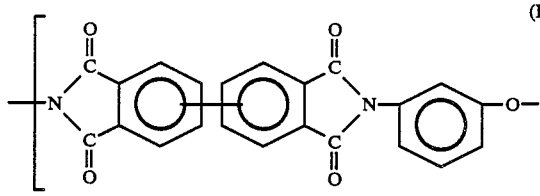
(IV)

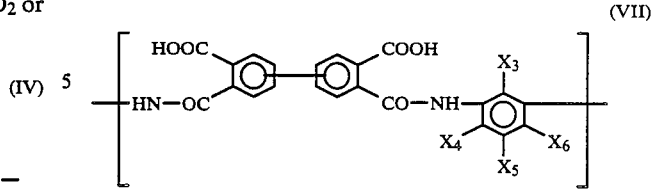
(VII)

wherein $X_3$, $X_4$, $X_5$ and $X_6$ which may be the same or different each represents H, F, Cl, $CH_3$, $C_2H_5$, $NO_2$ or $CF_3$; and a recurring unit of the formula (VIII)

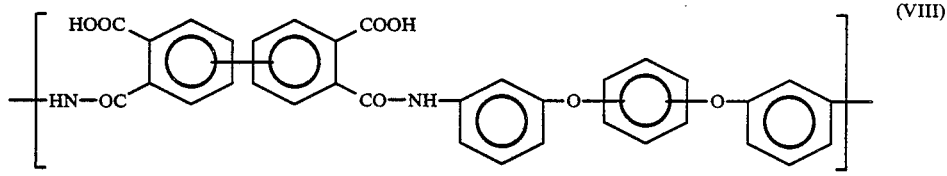
(VIII)

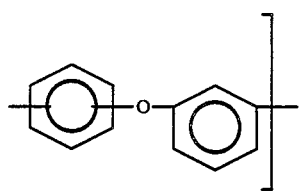

The process for producing a colorless polyimide shaped article according to this invention comprises preparing a solution of (A) a polyamide acid comprising as a main component at least one recurring unit selected from the group consisting of a recurring unit of the formula (V)

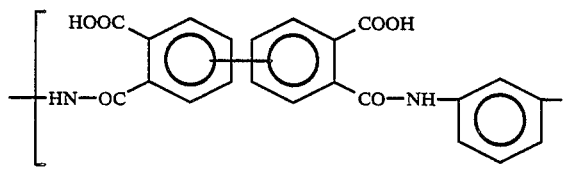
(V)

wherein $X_1$ represents O, S, $SO_2$, $CF_2$, $C(CH_3)_2$, $C(CF_3)_2$ or CO;

a recurring unit of the formfula (VI)

dissolved in (B) an amide-type organic polar solvent;

forming a shaped article of the polyamide acid from the solution; and imidizing the resulting shaped article of the polyamide acid.

DETAILED DESCRIPTION OF THE INVENTION

The polyamide acid used in the process of this invention can be obtained, for example, by reacting a biphenyltetracarboxylic acid dianhydride represented by the following formula (X)

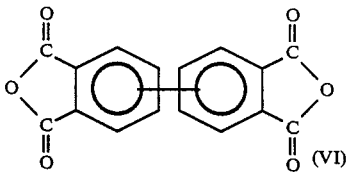
(X)

with at least one diamino compound selected from the group consisting of aromatic diamino compounds represented by the following formulae (XI) to (XIV)

wherein $X_2$ represents $SO_2$, $C(CH_3)_2$ or $C(CF_3)_2$; a recurring unit of the formula (VII)

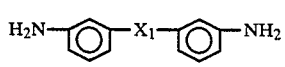
(XI)

-continued

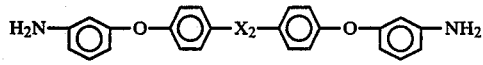 (XII)

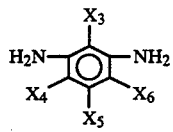 (XIII)

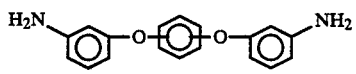 (XIV)

In formulae (XI) to (XIV), $X_1$ through $X_6$ are the same as defined above for formulae (I) to (IV).

Examples of the biphenyltetracarboxylic acid dianhydride are 3,3',4,4'-biphenyltetracarboxylic dianhydride of the formula

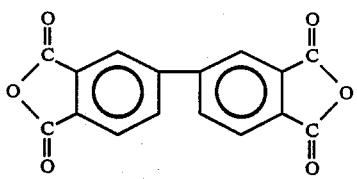

and 2,3,3',4'-biphenyltetracarboxylic dianhydride of the formula

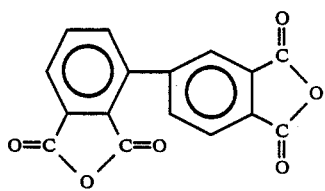

Of the aromatic diamino compounds having the amino groups at the m-position, typical examples of the aromatic binuclear diamines of the formula (XI) include

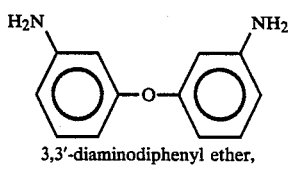
3,3'-diaminodiphenyl ether,

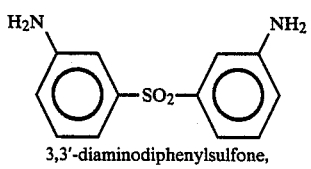
3,3'-diaminodiphenylsulfone,

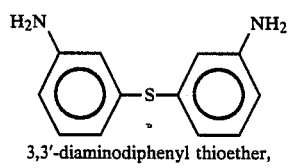
3,3'-diaminodiphenyl thioether,

-continued

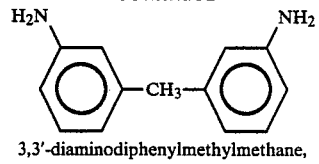
3,3'-diaminodiphenylmethylmethane, and

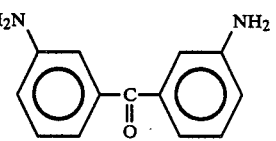
3,3'-diaminobenzophenone.

Typical examples of the aromatic tetranuclear diamines of the formula (XII) include

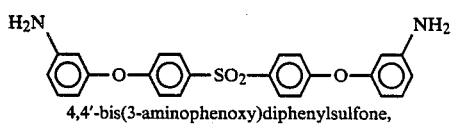
4,4'-bis(3-aminophenoxy)diphenylsulfone,

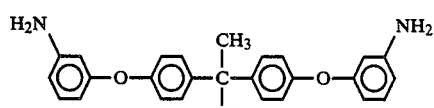
4,4'-bis(3-aminophenoxy)diphenylpropane, and

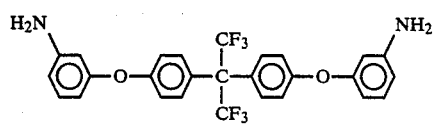
4,4'-bis(3-aminophenoxy)diphenylhexafluoropropane.

Typical examples of the aromatic mononuclear diamines of the formula (XIII) include

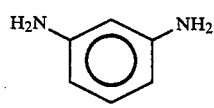
m-phenylenediamine,

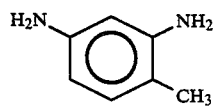
2,4-toluenediamine,

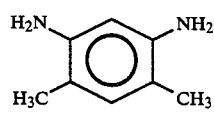
4,6-dimethyl m-phenylenediamine,

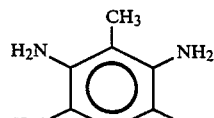
2,4-diaminomesitylene,

-continued

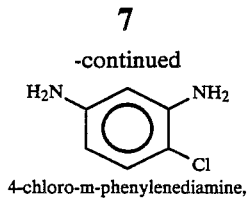
4-chloro-m-phenylenediamine,

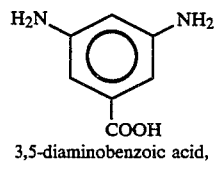
3,5-diaminobenzoic acid, and

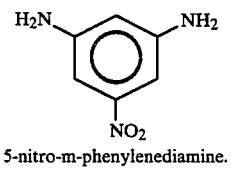
5-nitro-m-phenylenediamine.

Typical examples of the aromatic trinuclear diamines represented by the formula (XIV) include

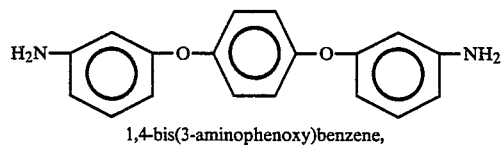
1,4-bis(3-aminophenoxy)benzene, and

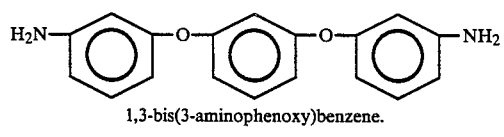
1,3-bis(3-aminophenoxy)benzene.

The aromatic binuclear diamine, the aromatic tetranuclear diamine, the aromatic mononuclear diamine and the aromatic trinuclear diamine may be used alone or in suitable combinations thereof.

By combining the biphenyltetracarboxylic acid dianhydride with the aromatic diamine having the amino groups at the m-position, a colorless transparent polyimide shaped article having at least one recurring unit of the formulae (I) to (IV) as a main component can be obtained for the first time. The term "as a main component" used herein refers to include the case where the polyimide consists entirely of at least one recurring unit described above.

The colorless nature and transparency of the resulting polyimide shaped article are higher as the content of at least one recurring unit of formulae (I) to (IV) is larger. The colorless nature and transparency required by this invention can be secured if the polyimide shaped article contains at least 70 mol % of at least one recurring unit of the formulae (I) to (IV). Hence, within this quantitative range, another aromatic tetracarboxylic acid dianhydride than the biphenyltetracarboxylic acid dianhydride and another diamino compound than the aromatic diamines having the amino groups at the m-position may be used in this invention. The content of at least one recurring unit of the formulae (I) to (IV) is preferably at least 70 mol %, and more preferably at least 95 mol %.

Examples of the other aromatic tetracarboxylic acid dianhydride are pyromellitic dianhydride, 3,3',4,4'-benzophenonetetracarboxylic dianhydride, 4,4'-hydroxydiphthalic dianhydride, 4,4'-bis(3,4-dicarboxyphenoxy)diphenylsulfone dianhydride, 2,2-bis(3,4-dicarboxyphenyl)hexafluoropropane dianhydride, 2,3,6,7-naphthalenetetracarboxylic acid dianhydride, 1,2,5,6-naphthalenetetracarboxylic dianhydride, and 1,4,5,8-naphthalenetetracarboxylic dianhydride. They may be used either alone or in combination.

Examples of the other diamino compound include 4,4'-diaminodiphenylether, 3,4'-diamino-diphenylether, 4,4'-diaminodiphenylsulfone, 4,4'-diaminodiphenylmethane, 4,4'-diaminobenzophenone, 4,4'-diaminodiphenylpropane, p-phenylenediamine, benzidine, 3,3'-dimethylbenzidine, 4,4'-diaminodiphenyl thioether, 3,3'-dimethoxy-4,4'-diaminodiphenylmethane, 3,3'-dimethyl-4,4'-diaminodiphenylmethane, 2,2-bis(4-aminophenyl)propane, and 2,2-bis[4-(4-aminophenoxy)phenyl]hexafluoropropane. They may be used either alone or in combination.

The colorless transparent polyimide shaped article of this invention can be obtained, for example, by polymerizing the aromatic tetracarboxylic acid dianhydride and diamino compound described above in an organic polar solvent at a temperature of 80° C. or less to form a polyamide acid solution, forming a shaped article of the desired shape from the polyamide acid solution, and maintaining the shaped article in air or an inert gas at a temperature of 50 to 350° C. under atmospheric or reduced pressure to evaporate the organic polar solvent and simultaneously dehydrocyclize the polyamide acid to a polyimide. It can also be obtained by a chemical imidization method comprising solvent removal and imidization of the polyamide acid using a benzene solution of pyridine and acetic anhydride, for example.

Amide-type organic polar solvents such as dimethylformamide and dimethylacetamide are preferred as the organic polar solvent. Amide-type organic polar solvents having a boiling point of 170° C. or less, such as dimethylacetamide, are especially preferred. These organic polar solvents may be used alone or in combination. The use of N-methyl-2-pyrrolidine as the organic polar solvent, however, should preferably be avoided. N-methyl-2-pyrrolidone is partly decomposed by heating at the time of heating the shaped article from the polyamide acid solution to dehydrocyclize it to a polyimide, and the decomposition product remains in the polyimide and looks blackish brown. This decomposition product tends to color the final polyimide shaped article yellowish brown. Because the above illustrated organic polar solvents such a dimethylacetamide have low boiling points, they volatilize before they are decomposed by heating, and do not color the final polyimide shaped article as does N-methyl-2-pyrrolidone. If, however, N-methyl-2-pyrrolidone is used as the polymerization solvent and after synthesis of polyamide acid, the solvent is replaced and the resulting polyamide acid is dissolved in the above-illustrated preferred solvents, the above defect of N-methyl-2-pyrrolidone can be eliminated. In this case, the above-illustrated preferred solvents become diluting solvents. Thus, in the production of the polyamide shaped article, it is also possible to use different compounds as the polymerization solvent and the diluting solvent, and to dissolve the resulting polyamide acid in the diluting solvent by solvent replacement.

In using the above-illustrated preferred organic polar solvents, they may be mixed with at least one poor or good solvent which does not reduce the transparency of the polymer, for example, ethanol, toluene, benzene, xylene, dioxane, tetrahydrofuran and nitrobenzene, in amounts which do not reduce the solubilizing power of the organic polar solvents. Since the use of such additional solvents in large amounts adversely affects the solubility of the resulting polyamide acid, the amount of such solvents should desirably be limited to less than 50% by weight, preferably up to 30% by weight, based on the entire solvents used.

In the preparation of the colorless transparent polyimide shaped article, the polyamide acid solution preferably has a logarithmic viscosity (inherent viscosity) in the range of 0.3 to 5.0, especially preferably in the range of 0.4 to 2.0. The logarithmic viscosity is measured in N-methyl-2-pyrrolidone in a concentration of 0.5 g/100 ml. If the logarithmic viscosity of the polyamide solution is too low, the mechanical strength of the resulting polyimide shaped article becomes undesirably low. If its logarithmic viscosity is too high, it is difficult to cast the polyamide acid solution in shaping it into a suitable shape, and handling the solution becomes difficult. Preferably, the concentration of the polyamide acid solution is adjusted to 5 to 30% by weight, especially 15 to 25%, from the standpoint of the handlability of the polyamide acid solution.

The logarithmic viscosity is calculated in accordance with the following equation, the the viscosity in the equation is measured by a capillary viscometer.

$$\text{Logarithmic viscosity} = \frac{\text{Natural logarithm} \frac{(\text{Viscosity of the solution})}{(\text{Viscosity of the solvent})}}{\text{Concentration of the polymer in the solution}}$$

The method of shaping the polyamide acid solution differs depending upon the shape of the desired shaped article. For example, in the preparation of a polyimide film, the polyamide acid solution is cast on a mirror surface of a glass plate, a stainless steel plate, or the like to a fixed thickness, and then gradually heated at a temperature of 100 to 350° C. to dehydrocyclize it and imidize the polyamide acid. The removal of the organic polar solvent and the heating for the imidization of the polyamide acid in the formation of the film from the polyamide acid solution may be carried out successively. These steps may be carried out under reduced pressure or in an atmosphere of an inert gas. The properties of the resulting polyimide film can be improved by finally heating it to about 400° C. for a short period of time. Another method of forming the polyimide film is casting the polyamide acid solution on a glass plate or the like, drying it by heating it at 100° to 150° C. for 30 to 120 minutes to form a film, and immersing the film, for example, in a benzene solution of pyridine and acetic anhydride, thereby removing the solvent and imidizing the film to a polyimide film. This method can also give a polyimide film.

The resulting polyimide film is colorless transparent and is not colored yellow or yellowish brown as in the prior art. Accordingly, it has very good transparency even when its thickness is increased.

Shaping from the polyamide acid solution is not limited to the formation of the polyimide film, but can be applied to the formation of other shaped articles such as a plastic lens. In this case, thermal imidization or a chemical imidization can be selected to imidize the polyamide acid.

In imidizing the polyamide acid solution to a polyimide, the resulting polyimide preferably has a logarithmic viscosity (measured at 30° C. in 97% sulfuric acid at a concentration of 0.5 g/dl) within the range of 0.3 to 4.0, more preferably at least 0.4, in view of its properties.

The resulting polyimide shaped article is colorless transparent and has a very high degree of transparency unlike conventional polyimide shaped articles.

In the present invention, the term "colorless transparent" means that the transmittance of visible light (500 nm) through a polyimide film having a thickness of $50\pm5$ μm is at least 70%, and its yellowness index of the film is 40 or less. The transmittance can be measured in accordance with ATM-D-1003, and the yellowness index, in accordance with JIS K-7103.

An especially high degree of transparency can be obtained by using the aromatic binuclear diamines of the formula (XI) and the aromatic tetranuclear diamines of the formula (XII) in which $X_1$ and $X_2$ are $SO_2$. Polyimide shaped articles obtained by using these diamines have very good heat resistance as well as very high transparency.

The polyimide shaped article of this invention is obtained from a combination of the biphenyltetracarboxylic acid dianhydride and the special aromatic diamine having the amino groups at the m-position, are colorless and transparent, and have a very high degree of transparency without being colored yellow or yellowish brown as in the prior art. When a solution of polyamide acid in an amide-type organic polar solvent typified by dimethylacetamide is used in the production of the polyimide shaped article, the solvent volatilized before it is decomposed during heating for dehydrocyclizing polyamide acid to a polyimide. Accordingly, there is no inconvenience of coloration of the polyimide by a blackish brown decomposition product of N-methyl-2-pyrrolidone formed by heating during imidization, and a polyimide shaped article which is completely colorless and transparent can be produced.

Since the polyimide shaped article of this invention is colorless and transparent, it can be used as a thick liquid crystalline oriented film. It can also be used as a base film for solar cells, a base material for polarizing films, and coating materials for special aerospace components such as solar cells and heat control systems or in optical applications requiring heat resistance, and as coating materials for such optical applications. Since it has a refractive index of at least 1.7 which is the highest among polymers, it is also useful as a plastic lens or a coating material for lenses.

The following Examples and Comparative Examples illustrate the present invention more specifically.

In the tables given hereinafter, the following abbreviations are used.

s-BPDA: 3,3',4,4'-bisphenyltetracarboxylic dianhydride
a-BPDA: 2,3,3',4'-biphenyltetracarboxylic dianhydride
PMDA: pyromellitic dianhydride
3,3'-BAPS: 4,4'-bis(3-aminophenoxy)diphenylsulfone
3,3'-BAPP: 4,4'-bis(3-aminophenoxy)diphenylpropane
3,3'-BAPF: 4,4'-bis)3-aminophenoxy)diphenylhexafluoropropane
4,4'-DDE: 4,4'-diaminodiphenylether
4,4'-BAPP: 4,4'-bis(4-aminophenoxy)diphenylpropane 3,3'-DDE: 3,3'-diaminodiphenyl ether
3,3'-DDS: 3,3'-diaminodiphenylsulfone
3,3'-DDM: 3,3'-diaminodiphenylmethane
3,3'-DSP: 3,3'-diaminodiphenyl thioether
3,3'-DBP: 3,3'-diaminobenzophenone
m-PDA: m-phenylenediamine
2,4-TDA: 2,4-toluenediamine
2,4-DMX: 4,6-dimethyl-m-phenylenediamine
DAMS: 2,4-diaminomesitylene
CPDA: 4-chloro-m-phenylenediamine
3,5-DABA: 3,5-diaminobenzoic acid
NPDA: 5-nitro-m-phenylendiamine
1,4,3-PAPB: 1,4-bis(3-aminophenoxy)benzene
1,3,3-BAPB: 1,3-bis(3-aminophenoxy)benzene
DMAc: dimethylacetamide
DMF: dimethylformamide
NMP: N-methyl-2-pyrrolidone

EXAMPLES 1 TO 43 AND COMPARATIVE EXAMPLES 1 TO 3

In each run, a 1 liter separable flask was charged with each of the solvents and each of the diamino compounds shown in Table 1, and they were well mixed at room temperature until the diamino compound completely dissolved. The amount of the solvent was prescribed so that the concentration of the diamino compound and each of the aromatic tetracarboxylic acid dianhydride shown in Table 1 became 20% by weight.

Then, the aromatic tetracarboxylic acid dianhydride was gradually added to the flask while inhibiting elevation of the temperature by exotherm. Then, with stirring, the monomers were reacted at room temperature for 4 hours to form a solution of polyamide acid having each of the logarithmic viscosities shown in Table 1.

The polyamide acid solution so obtained was cast on a glass place to form a film. The film was heated in a hot air dryer at 120° C. for 60 minutes, further at 180° C. for 60 minutes and then at 250° C. for 6 hours to imidize the film and form a polyimide film having a thickness of 50±5 μm.

When the infrared absorption spectrum of the film was measured, no absorption inherent to amide acid was observed, but a characteristic absorption based on the imide group was observed in the vicinity of 1780 cm$^{-1}$.

The yellowness index and the transmittance at visible light (500 nm) of the resulting polyimide film were measured. The results obtained are shown in Table 1.

TABLE 1

| | Acid Anhydride | Diamino Compound | Solvent | Logarithmic Viscosity (Polyamide Acid) | Yellowness Index | Transmittance (%, at 500 nm) |
|---|---|---|---|---|---|---|
| Example | | | | | | |
| 1 | s-BPDA | 3,3'-DDS | DMAc | 0.56 | 17 | 86 |
| 2 | S-BPDA | 3,3'-DDE | DMAc | 1.78 | 19 | 85 |
| 3 | s-BPDA | 3,3'-DAM | DMAc | 0.81 | 36 | 81 |
| 4 | s-BPDA | 3,3'-DSP | DMF | 0.76 | 37 | 81 |
| 5 | s-BPDA | 3,3'-DBP | DMAc | 1.12 | 39 | 82 |
| 6 | s-BPDA | 3,3'-DBP | DMF | 1.12 | 39 | 82 |
| 7 | s-BPDA | 3,3'-DDE | DMAc | 0.67 | 7 | 87 |
| 8 | s-BPDA | 3,3'-DDE (75 mole %) 4,4'-DDe (25 mole %) | DMAc | 1.21 | 24 | 83 |
| 9 | a-BPDA | 3,3'-DDE (75 mole %) 4,4'-DDE (25 mole %) | DMAc | 0.83 | 21 | 84 |
| 10 | s-BPDA | 3,3'-DDE (96 mole %) 4,4'-DDE (4 mole %) | DMAc | 1.10 | 20 | 83 |
| 11 | s-BPDA | 3,3'-BAPS | DMAc | 1.34 | 20 | 84 |
| 12 | s-BPDA | 3,3'-BAPP | DMAc | 2.01 | 33 | 82 |
| 13 | s-BPDA | 3,3'-BAPF | DMAc | 1.80 | 15 | 86 |
| 14 | a-BPDA | 3,3'-BAPP | DMAc | 1.70 | 22 | 84 |
| 15 | s-BPDA/PMDA (70 mole %)/(30 mole %) | 3,3'-BAPF | DMAc | 2.11 | 29 | 83 |
| 16 | a-BPDA/PMDA (70 mole %)/(30 mole %) | 3,3'-BAPS | DMAc | 1.04 | 31 | 83 |
| 17 | s-BPDA | 3,3'-BAPS (70 mole %) 4,4'-DDE (30 mole %) | DMAc | 1.48 | 28 | 84 |
| 18 | s-BPDA | 3,3'-BAPF (70 mole %) 4,4'-DDE (30 mole %) | DMAc | 1.87 | 26 | 84 |
| 19 | s-BPDA | 3,3'-BAPS (75 mole %) 4,4'-DDE (25 mole %) | DMAc | 1.31 | 26 | 83 |
| 20 | s-BPDA | 3,3'-BAPS (70 mole %) 4,4'-DDE (30 mole %) | DMF | 1.48 | 28 | 84 |
| 21 | s-BPDA | 3,3'-BAPF (70 mole %) 4,4'-DDE (30 mole %) | DMF | 1.87 | 26 | 84 |
| 22 | s-BPDA | 3,3'-BAPS (75 mole %) 4,4'-DDE (25 mole %) | DMF | 1.31 | 26 | 83 |
| 23 | s-BPDA 3,3'-BAPS (10 mole %) | 3,3'-DDS (90 mole %) | DMAc | 0.65 | 17 | 85 |
| 24 | s-BPDA | 3,3'-DDS (50 mole %) 3,3'-BAPS (50 mole %) | DMAc | 0.74 | 17 | 85 |
| 25 | s-BPDA | 3,3'-DDS (10 mole %) 3,3'-BAPS (90 mole %) | DMAc | 1.00 | 16 | 85 |
| 26 | s-BPDA | 3,3'-DDS (35 mole %) 3,3'-BAPS (35 mole %) 4,4'-DDE (30 mole %) | DMAc | 0.80 | 24 | 82 |
| 27 | s-BPDA | m-PDA | DMAc | 1.05 | 28 | 84 |
| 28 | s-BPDA | 2,4-TDA | DMAc | 0.94 | 34 | 82 |
| 29 | s-BPDA | 2,4-DMX | DMAc | 0.98 | 30 | 83 |
| 30 | s-BPDA | DAMS | DMAc | 1.12 | 32 | 83 |
| 31 | s-BPDA | CPDA | DMF | 1.01 | 36 | 80 |

TABLE 1-continued

|  | Acid Anhydride | Diamino Compound | Solvent | Logarithmic Viscosity (Polyamide Acid) | Yellowness Index | Transmittance (%, at 500 nm) |
|---|---|---|---|---|---|---|
| 32 | s-BPDA | 3,5-DABA | DMF | 1.30 | 35 | 81 |
| 33 | s-BPDA | NPDA | DMAc | 0.84 | 29 | 83 |
| 34 | s-BPDA | 1,4,3-BAPB | DMAc | 1.77 | 24 | 84 |
| 35 | s-BPDA | 1,3,3-BAPB | DMAc | 1.95 | 23 | 84 |
| 36 | a-BPDA | m-PDA | DMF | 1.02 | 18 | 86 |
| 37 | a-BPDA | 3,5-DABA | DMF | 0.84 | 19 | 86 |
| 38 | a-BPDA | 1,4,3-BAPB | DMAc | 1.57 | 11 | 87 |
| 39 | a-BPDA | m-PDA (70 mole %) 2,4-DMX (30 mole %) | DMF | 1.00 | 32 | 83 |
| 40 | a-BPDA | NPDA (50 mole %) CPDA (50 mole %) | DMAc | 0.81 | 35 | 81 |
| 41 | a-BPDA | 1,4,3-BAPB (50 mole %) 1,3,3-BAPB (50 mole %) | DMAc | 1.76 | 12 | 87 |
| 42 | a-BPDA | 2,4-TDA (90 mole %) 4,4-DDE (10 mole %) | DMAc | 1.45 | 38 | 80 |
| 43 | s-BPDA | 1,4,3-BAPB (70 mole %) 4,4-DDE (30 mole %) | DMAc | 2.04 | 36 | 81 |
| Comparative Example |  |  |  |  |  |  |
| 1 | s-BPDA | 4,4'-BAPP | DMAc | 1.90 | 60 | 71 |
| 2 | s-BPDA | 4,4'-DDE | DMAc | 2.32 | 60 | 70 |
| 3 | PMDA | 4,4'-DDE | NMP | 2.84 | 130 | 27 |

The yellowness index was measured by using an SM color computer made by Suga Testing Instrument Co., Ltd. Larger yellowness indices show higher degrees of yellowness.

The transmittance was measured by using a spectrophotometer made by Shimazu Seisakusho Co., Ltd. Larger transmittance values show higher degrees of transparency.

In Table 1, Examples 1 to 10 show the use of aromatic binuclear diamines as the diamino compound having the amino groups at the m-position. Examples 11 to 20 show the use of aromatic tetranuclear diamines as the diamino compound. Examples 23 to 26 show the use of aromatic binuclear diamines and the aromatic tetranuclear diamines in combination as the diamino compound. Examples 27 to 33 show the use of aromatic mononuclear diamines as the diamino compound having the amino groups at the m-position. Examples 34 to 38 show the use of aromatic trinuclear diamines as the diamino compound. Examples 39 to 43 show the use of aromatic mononuclear diamines and aromatic trinuclear diamines in combination as the diamino compound.

As is seen from the table, all of the polyimide films obtained in Examples 1 to 43 have a yellowness index of less than 40 and a transmittance of more than 70%, and are therefore colorless and transparent. In contrast, in Comparative Example 1 (the film described in Japanese Patent Application (OPI) No. 91430/83), a diamino compound having the amino groups at the p-position was used. The resulting polymer therefore had a lower yellowness index and a lower transmittance than in Examples. It is seen that the particularly low index show yellow coloration of the film. In Comparative Example 2, a diamino compound having the amino groups at the p-position was used. Hence, the film had a considerably low yellowness index and a considerably low transmittance. In Comparative Example 3, N-methyl-2-pyrrolidone was used as the solvent. Hence, the film had a higher degree of yellowness than in Comparative Examples 1 and 2, and the film was colored yellowish brown.

While the invention has been described in detail and with reference to specific embodiments thereof, it will be apparent to one skilled in the art that various changes and modifications can be made therein without departing from the spirit and scope thereof.

What is claimed is:

1. A colorless transparent polyimide shaped article comprising as a main component at least one recurring unit selected from the group consisting of a recurring unit of the formula (I)

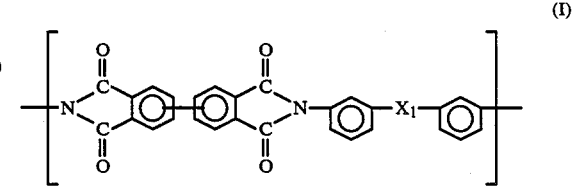

wherein $X_1$ represents O, S, $SO_2$, $CH_2$, $CF_2$, $C(CH_3)_2$, $C(CF_3)_2$ or CO;

a recurring unit of the formula (II)

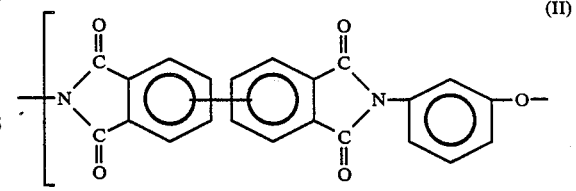

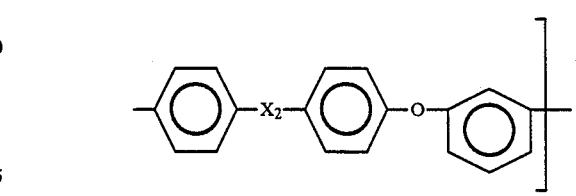

wherein $X_2$ represents $SO_2$, $C(CH_3)_2$ or $C(CF_3)_2$;

a recurring unit of the formula (III)

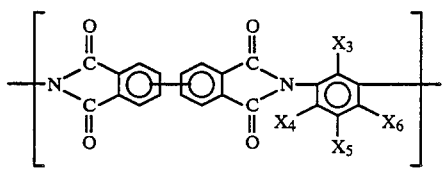
(III)

wherein $X_3$, $X_4$, $X_5$ and $X_6$ which may be the same or different each represents H, F, Cl, $CH_3$, $C_2H_5$, $NO_2$ or $CF_3$; and a recurring unit of the formula (IV)

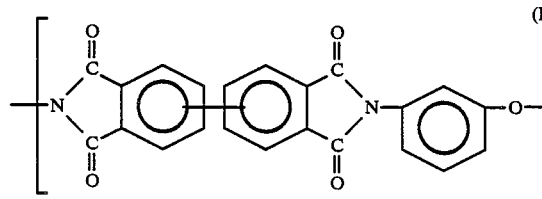
(IV)

2. A colorless transparent polyimide shaped article as in claim 1, wherein the content of at least one recurring unit of the formulae (I) to (IV) is at least 70 mol %.

3. A colorless transparent polyimide shaped article as in claim 1, wherein the content of at least one recurring unit of the formulae (I) to (IV) is at least 95 mol %.

4. A colorless transparent polyimide shaped article as in claim 1, having a trasmittance of visible light (500 nm) through a polyimide film having a thickness of 50±5 μm of at least 70%, measured according to ASTM D-1003, and a yellowness index of the polyimide film of 40 or less, measured according to JIS K-7103.

5. A process for producing a colorless polyimide shaped article, which comprises preparing a solution of
(A) a polyamide acid comprising as a main component at least one recurring unit selected from the group consisting of a recurring unit of the formula (V)

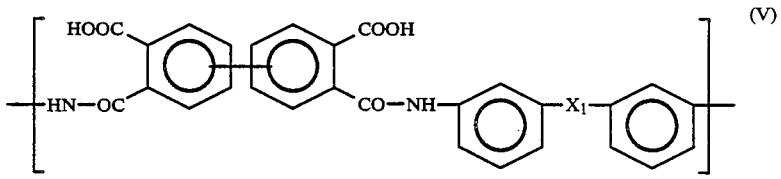
(V)

wherein $X_1$ represents O, S, $SO_2$, $CF_2$, $C(CH_3)_2$, $C(CF_3)_2$ or CO; a recurring unit of the formula (VI)

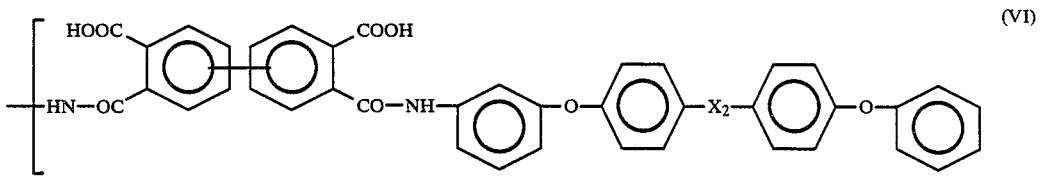
(VI)

wherein $X_2$ represents $SO_2$, $C(CH_3)_2$ or $C(CF_3)_2$; a recurring unit of the formula (VII)

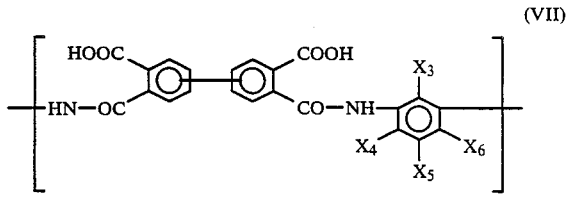
(VII)

wherein $X_3$, $X_4$, $X_5$ and $X_6$ which may be the same or different each represents H, F, Cl, $CH_3$, $C_2H_5$, $NO_2$ or $CF_3$; and a recurring unit of the formula (VIII)

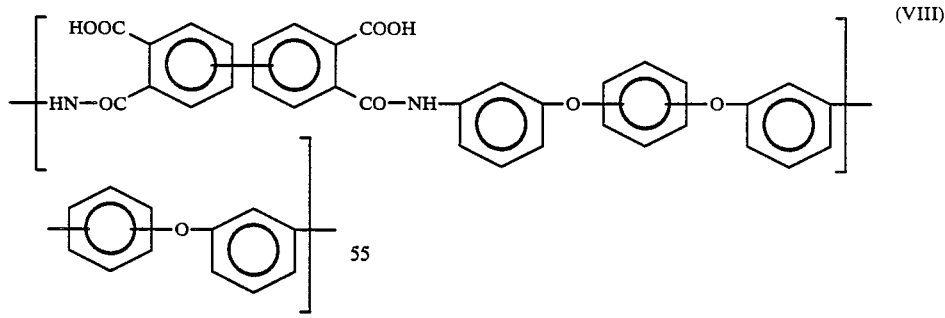
(VIII)

dissolved in (B) an amide-type organic polar solvent having a boiling point of 170° C. or less;
    forming a shaped article of the polyamide acid from the solution; and
    imidizing the resulting shaped article of the polyamide acid.

6. A process as in claim 5, wherein the polyamide acid is obtained by reacting a biphenyltetracarboxylic acid dianhydride represented by the formula (X)

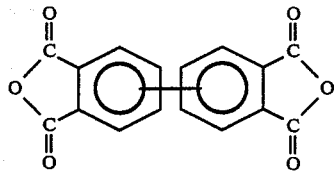
(X)

with at least one diamino compound selected from the group consisting of aromatic diamino compounds represented by the following formulae (XI) to (XIV)

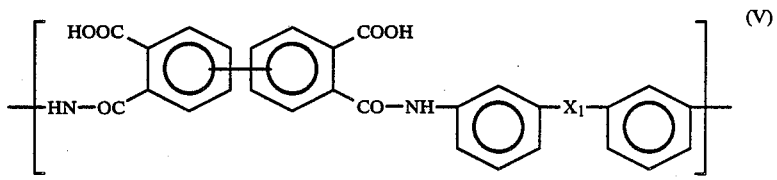

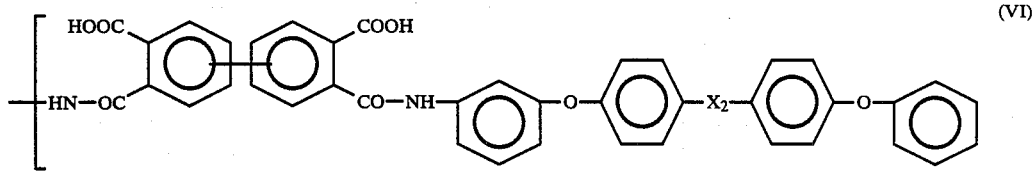

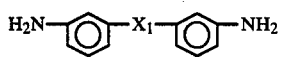
(XI)

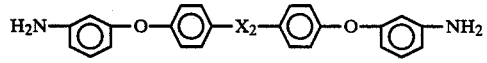
(XII)

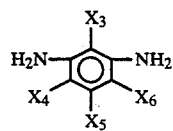
(XIII)

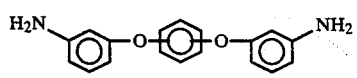
(XIV)

wherein $X_1$ to $X_6$ are the same as defined in claim 1.

7. A process as in claim 5, wherein the reaction is conducted at 80° C. or less.

8. A process as in claim 5, wherein the polyamide acid has a logarithmic viscosity of 0.3 to 5.0.

9. A process as in claim 5, wherein the polyamide acid solution has a concentration of 5 to 30% by weight.

10. A process as in claim 5, wherein the organic polar solvent is dimethylformamide, dimethylacetamide or a mixture thereof.

11. A solution comprising
(A) a polyamide acid comprising as in main component at least one recurring unit selected from the group consisting of a recurring unit of the formula (V)

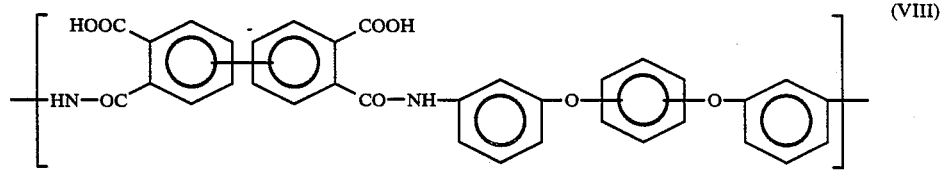
(V)

wherein $X_1$ represents O, S, $SO_2$, $CF_2$, $C(CH_3)_2$ or CO; a recurring unit of the formula (VI)

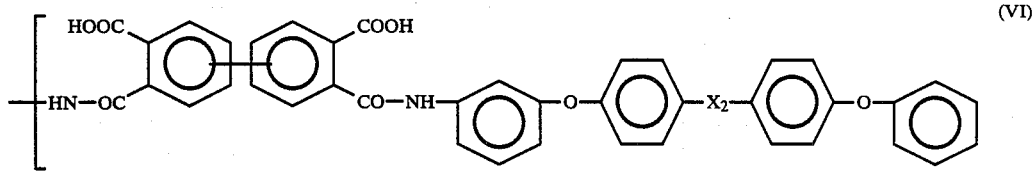
(VI)

wherein $X_2$ represents $SO_2$, $C(CH_3)_2$ or $C(CH_3)_2$ or $C(CF_3)_2$; a recurring unit of the formula (VII)

(VII)

wherein $X_3$, $X_4$, $X_5$ and $X_6$ which may be the same or different each represents H, F, Cl, $CH_3$, $C_2H_5$, $NO_2$ or $CF_3$; and a recurring unit of the formula (VIII)

(VIII)

and
(B) an amide-type organic polar solvent having a boiling point of 170° C. or less, (A) being dissolved in (B).

12. A colorless polyimide shaped article produced by the process which comprises preparing a solution of
(A) a polyamide acid comprising as a main component at least one recurring unit selected from the group consisting of a recurring unit of the formula (V)

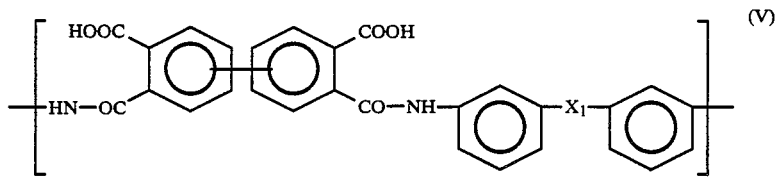

wherein $X_1$ represents O, S, $SO_2$, $CF_2$, $C(CH_3)_2$, $C(CF_3)_2$ or CO; a recurring unit of the formula (VI)

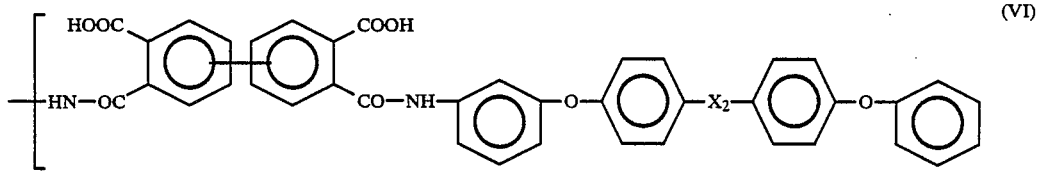

wherein $X_2$ represents $SO_2$, $C(CH_3)_2$ or $C(CF_3)_2$; a recurring unit of the formula (VII)

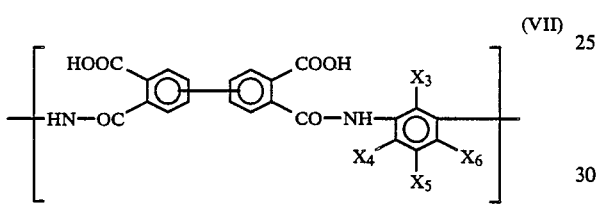

wherein $X_3$, $X_4$, $X_5$ and $X_6$ which may be the same or different each represents H, F, Cl, $CH_3$, $C_2H_5$, $NO_2$ or $CF_3$; and a recurring unit of the formula (VIII)

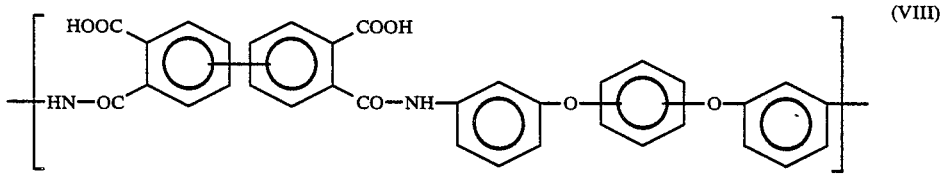

dissolved in (B) an amide-type organic polar solvent having a boiling point of 170° C. or less;
forming a shaped article of the polyamide acid from the solution; and
imidizing the resulting shaped article of the polyamide acid.

13. A color polyimide shaped article produced according to the process of claim 5, wherein the polyamide acid is obtained by reacting a biphenyltetracarboxylic acid dianhydride represented by the formula (X)

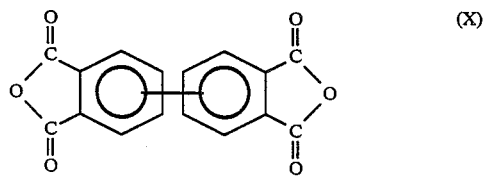

with at least one diamino compound selected from the group consisting of aromatic diamino compounds represented by the following formulae (XI) to (XIV)

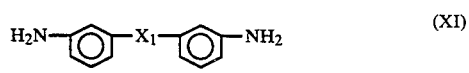

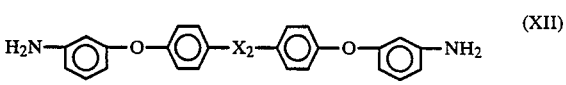

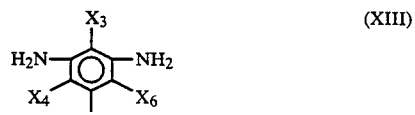

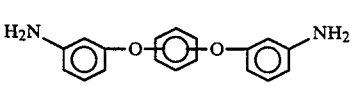

wherein $X_1$ and $X_6$ are the same as defined in claim 1.

14. A colorless polyimide shaped article produced according to the process of claim 5, wherein the reaction is conducted at 80° C. or less.

15. A colorless polyimide shaped article produced according to the process of claim 5, wherein the polyamide acid has a logarithmic viscosity of 0.3 to 5.0.

16. A colorless polyimide shaped article produced according to the process of claim 5, wherein the polyamide acid solution has a concentration of 5 to 30% by weight.

17. A colorless polyimide shaped article produced according to the process of claim 5, wherein the organic polar solvent is dimethylforamide, diamethyalacetamide or a mixture thereof.

* * * * *